United States Patent [19]

Statkus

[11] 4,351,502
[45] Sep. 28, 1982

[54] CONTINUOUS SKIN, VARIABLE CAMBER AIRFOIL EDGE ACTUATING MECHANISM

[75] Inventor: Frank D. Statkus, Woodinville, Wash.

[73] Assignee: The Boeing Company, Seattle, Wash.

[21] Appl. No.: 142,121

[22] Filed: May 21, 1980

[51] Int. Cl.³ .............................................. B64C 3/48
[52] U.S. Cl. .................................. 244/219; 244/214; 244/215
[58] Field of Search .............................. 244/213–216, 244/218, 219

[56] References Cited

U.S. PATENT DOCUMENTS

| | | | |
|---|---|---|---|
| 1,567,531 | 12/1925 | Magni | 244/219 |
| 4,012,013 | 3/1977 | Henderson et al. | 244/219 |
| 4,053,124 | 10/1977 | Cole | 244/219 |
| 4,159,089 | 6/1979 | Cole | 244/219 |
| 4,171,787 | 10/1979 | Zapel | 244/214 |
| 4,230,295 | 10/1980 | Eppler | 244/215 |
| 4,252,287 | 2/1981 | Zimmer | 244/219 |

FOREIGN PATENT DOCUMENTS

| | | | |
|---|---|---|---|
| 103400 | 1/1917 | United Kingdom | 244/219 |
| 1496519 | 12/1977 | United Kingdom | 244/219 |

*Primary Examiner*—Galen L. Barefoot
*Attorney, Agent, or Firm*—Robert B. Hughes; J. Robert Cassidy; Bernard A. Donahue

[57] ABSTRACT

An actuating mechanism for variable camber edges of aerodynamic airfoils—viz., variable camber leading edges and/or variable camber trailing edges—characterized by its rigidity and structural stability and which permits varying the camber of a flexible continuous airfoil skin while maintaining a uniform, essentially constant curvature throughout the chordal extent of deflection for any given degree of deflection; yet, wherein (a) the airfoil skin (i) is not required to function as a load carrying element, (ii) is not subjected to chordwise stress from movement of the actuating linkage, and (iii) is not subjected to localized stress resulting from localized deflection; (b), the actuating linkage is contained entirely within the airfoil aerodynamic contour at all operating positions; (c), the actuating linkage is readily adaptable for use with, and is compatible with, virtually any conventional structural wing box without requiring modification of the wing box structure and without compromise to wing box location and/or extent; and (d), which permits of optimized negative (down) and positive (up) deflection of a desired airfoil edge so as to permit attainment of differing optimized airfoil performance characteristics for virtually any type of airfoil. More specifically, the present invention pertains to simplified actuating linkages for continuous skin variable camber airfoil edges comprising only two sets of 4-bar linkages—viz., one set to control horizontal and vertical displacement of the structural member defining the airfoil edge, and the other set controlling the angle of rotation of such structural member and the moment applied to the end of the flexible skin panel.

24 Claims, 13 Drawing Figures

CONTINUOUS SKIN, VARIABLE CAMBER AIRFOIL EDGE ACTUATING MECHANISM

The Government has rights in this invention pursuant to Contract No. F33615-78-C-3027 awarded by the United States Air Force.

BACKGROUND OF THE INVENTION

The present invention relates generally to continuous skin, variable camber airfoils; and, more particularly, to improved actuating mechanisms for such variable camber airfoils which are characterized by their simplicity, rigidity and stability, yet which permit attainment of optimized aerodynamic airfoil configurations and/or reconfigurations without compromising structural wing box design and/or placement, without requiring the continuous flexible skin to function as a load carrying member, without the need for actuating members to project out of the desired optimized aerodynamic contour of the airfoil, and without the need for separate flaps and/or other structures which tend to produce discontinuities in the upper continuous skin surface of the airfoil.

In the design of airfoils—especially in light of today's highly advanced state of aircraft technology—many differing, and sometimes conflicting, design considerations must be taken into account such, merely by way of example, as the operating conditions to which the aircraft is to be subjected—e.g., subsonic, transonic and/or supersonic flight conditions. Each different set of operating conditions presents its own special and, ofttimes, unique problems in terms of desired and/or required airfoil performance characteristics. However, common to the problems of efficient and effective airfoil design is the continuing need to design improved actuating mechanisms for varying camber of the airfoil or, at least, of a portion of the airfoil—i.e., the leading and/or trailing edge(s) of the airfoil—in a smooth, efficient manner so as not to induce flow separation at localized regions on the surface of the airfoil, yet wherein the variable camber portion of the airfoil can be readily deployed to any desired operating position.

Those skilled in the art will appreciate that most conventional airfoil designs in use today—irrespective of whether intended for aircraft having subsonic, transonic and/or supersonic capability, and/or whether the aircraft is intended for commercial or other types of usage—require a rigid structural wing box which generally occupies at least 40% of the chord-wise dimension of the airfoil; such wing box serving to provide structural rigidity for the airfoil, primary structural frame members for attachment of leading edges, trailing edges and/or ailerons, as well as storage space for fuel. However, since trailing edge flaps, ailerons and actuating members therefore also commonly require 40% of the chord-wise dimension of the airfoil, this leaves only on the order of 20%, or less, of the airfoil's chord-wise dimension to accommodate leading edge flaps and actuating mechanisms. These conflicting demands for space have, prior to the advent of the present invention, mandated compromise on the part of the designer—i.e., a specific airfoil design has generally been required for each differing specific operational condition. That is, if, for example, high lift, low speed performance characteristics are required, separate flaps are commonly provided which, unfortunately, inherently result in skin surface discontinuities that deleteriously affect airfoil performance and which require complex actuating mechanisms. Alternatively, if separate flaps cannot be tolerated, the designer is forced to make some other compromise such, for example, as limiting the degree of permissible flap deflection, permitting actuating members to project out of the optimum airfoil contour, and/or permitting the actuating mechanism to penetrate into the critical area desirably reserved for the rigid structural wing box. The present invention obviates the need for such compromises.

From the standpoint of design and/or operating desideratum, a number of points are of primary interest. These include, for example, a variable camber system wherein: (i) the actuating mechanism is compatible with a wide range of airfoil designs and does not denigrate or otherwise compromise such requisite structural considerations as wing box location and or extent; (ii) the actuating mechanism is capable of providing a rigid airfoil structure at each different operating position and wherein load paths are maintained both simple and short; (iii) the variable camber control linkage mechanism is stable at all operating positions and essentially derives no strength from the skin—that is, wherein the airfoil skin does not serve as a load carrying element; (iv) the actuating linkage permits both positive (up) and negative (down) deflection through a maximum range of desired rotational angles while maintaining a smoothly continuous skin surface having a relatively constant curvature consistent with desired aerodynamic contours; and (v), the actuating linkage is equally applicable for usage in either or both of variable camber leading airfoil edges and/or trailing edges.

Many attempts have been made in the past to provide variable camber airfoil surfaces which meet certain selected design requirements and operational parameters. Such prior art attempts have involved many different approaches and have met with varying degrees of success. An early typical approach involved the use of "slip joints" and/or similar overlapping skin surfaces having the ability to "grow" and/or "shrink" as the degree of airfoil camber is increased and decreased. However, the design of such systems has commonly required the elimination of, or significant alteration of, the airfoil wing box. Because rigid wing box designs are eliminated or significantly altered, poor structural load paths result and, often, the skin itself has been required to function as a load carrying element. Moreover, in such systems undesired flow separation is commonly produced at the skin surface discontinuities in the regions of the slip joints or other overlapping flap arrangements. As a result of such limitations, this type of apparatus has generally been limited to usage where the airfoil need only operate in low dynamic pressure regions.

Typical prior art approaches involving "slip joints" or other overlapping flap constructions wherein the skin surface of the airfoil is characterized by one or more surface discontinuities are illustrated in, for example, British Provisional Pat. No. 103,400, Jan. 25, 1917 (a slip joint arrangement and actuating linkage for use in trailing edges); U.S. Pat. No. 1,567,531-Magni (a discontinuous lap joint and actuating linkage for varying camber throughout all or selected portions of the chord-wise dimension of an airfoil); U.S. Pat. No. 1,868,748-Hogan (a discontinuous lap joint and actuating linkage for leading and/or trailing edges); U.S. Pat. No. 3,179,357-Lyon (a slip joint and actuating linkage for trailing edges); and, U.S. Pat. No. 4,012,013-Ball et al (a slip joint and actuating linkage for an inlet ramp on supersonic aircraft). Other types of mechanisms disclosed in the prior art for varying camber along all or a substantial portion of the chord length of the airfoil are disclosed in U.S. Pat. Nos. 1,828,981-Parker, 1,886,362-Antoni, 2,022,806-Grant, and 3,716,209-Pierce.

In general, all of the foregoing proposed constructions result in one or more of (i) flow separation at localized areas of skin surface discontinuities, (ii) elimination or substantial reduction of the structural airfoil wing box with consequent denigration of structural load paths, (iii) lack of rigidity and stability in the actuating mechanism, (iv) a requirement that the skin of the airfoil function as a load carrying element, and/or (v), excessive undesired skin flutter which severely alters the performance characteristics of the airfoil. As a consequence, this type of construction has generally been limited to airfoils used in low dynamic pressure regions.

Another proposed "solution" to the problems inherent with variable camber airfoils has required the use of separate flaps such, for example, as the use of Krueger flaps at an airfoil leading edge in the manner disclosed in U.S. Pat. No. 3,504,870-Cole. Again, this type of construction is characterized by discontinuities in the upper skin surface of the airfoil which characteristically produce flow separation; and, further, is not suitable for cruise camber control but, rather, is limited to usage as a low speed, high lift device of the type commonly employed in take-off and/or landing operational modes.

Efforts to overcome the problems associated with discontinuities in the upper skin surface have contemplated the usage of variable camber leading and/or trailing edges wherein the airfoil employs a flexible skin which is subjected to rather sharp deflection in a highly localized region such, for example, as the arrangement disclosed in U.S. Pat. Nos. 1,763,888-Griswold, II, and 2,749,060-Brady et al. See, also, U.S. Pat. No. 2,650,047-Carhart et al. Because of the relatively sharp skin deflection in a localized region, such attempts have failed to solve the problem of flow separation—i.e., the sharp localized deflection area, although a continuous skin surface, still functions as a significant curvature discontinuity which produces flow separation. Moreover, in such constructions the airfoil skin is subjected to significant stress and, this fact places severe constraints on the degree of deflection permitted.

Other types of variable camber systems employing continuous upper skin surfaces are those disclosed in, for example: U.S. Pat. Nos. 2,763,448-Davie, Jr.; 3,836,099-O'Neill et al; 3,994,451-Cole; 3,994,452-Cole; and 4,053,124-Cole. These types of camber control arrangements commonly employ relatively complex linkages or, linkage mechanisms which project out of the aerodynamic contour of the airfoil. Moreover, they provide only limited camber control, generally do not permit of positive (up) flap control and, commonly violate wing box integrity. As a result of these problems, aircraft employing such control mechanisms are commonly limited to operation in low dynamic pressure regions.

Perhaps the most relevant of the prior art proposals of which the inventor and the inventor's assignee are presently aware are those disclosures in Zapel U.S. Pat. Nos. 4,131,253 and 4,171,787, assigned to the assignee of the present invention, which respectively disclose continuous flexible skin variable camber arrangements for airfoil trailing edge and airfoil leading edges. In these patent disclosures, while the flexible airfoil skin assumes a relatively constant smooth curvature devoid of interruptions throughout the region of airfoil deflection, the arrangements fail to obviate some of the more perplexing problems in variable camber airfoil design. Thus, the upper flexible skin surface is unsupported in all but the position of maximum deflection, thereby resulting in undesired "skin flutter"; only limited deflection is obtained—e.g., in the range of up to 15° to 16° negative deflection for either a leading edge (U.S. Pat. No. 4,171,787) or a trailing edge (U.S. Pat. No. 4,131,253); the actuating linkage mechanism disclosed requires the use of cam grooves and followers which, because of their requisite and inherent "loose fits", produce undesired "flap flutter" or chatter in addition to, and distinct from, the problem of "skin flutter" discussed above; and, such actuating linkages tend to impinge upon wing box integrity, particularly in the regions of the cam rollers, followers and slideways which project into the regions where the leading and trailing spars of a wing box are desirably located. Moreover, the number of individual links required and the arrangements for pivotally interconnecting such links tends to increase the length and complexity of load paths. Because of the foregoing disadvantages, variable camber trailing and/or leading edges of the types disclosed in the aforesaid Zapel patents are generally limited to usage in relatively low speed operating modes.

SUMMARY OF THE INVENTION

Accordingly, it is general aim of the present invention to provide an improved actuating mechanism suitable for use with continuous skin variable camber airfoils which overcomes the foregoing disadvantages inherent in conventional prior art variable camber control mechanisms and which permits changing airfoil contours to obtain optimum aerodynamic performance from a wide variety of different types of aircraft at various combinations of air speed, altitude and angles of attack. More specifically, the invention has as one of its principle objectives the provision of continuous skin variable camber control mechanisms characterized by their versatility and adaptability to virtually any airfoil design and which permit of optimal deflection of the variable camber portion of the airfoil through maximum operating ranges so as to enable the airfoil to be configured or, indeed, rapidly reconfigured in flight, to obtain optimum aerodynamic performance characteristics for operation at subsonic, transonic and/or supersonic operating modes. As a result of attaining these objectives, substantial improvements can be achieved in terms of payload ranges, maneuverability, and quality of ride.

A further general objective of the invention is the provision of an improved, simple, yet highly efficient control actuating mechanism for variable camber airfoils which permits varying the camber of continuous skin airfoils through a relatively wide range of deflection angles, including both positive (up) and negative (down) deflection angles; yet, wherein the degree of curvature of the deflected flexible skin surface remains substantially constant throughout the region of deflection for any given deflection angle, thereby insuring smooth, uniform uninterrupted airflow over the contour of the airfoil and attainment of optimized aerodynamic efficiencies and characterstics over a wide range of operating speeds and conditions. In this connection, it is an object of the invention to provide an improved variable camber system which permits optimization of both airfoil edge deflection and upper skin curvature to meet a wide range of desired aerodynamic configurations.

It is a more specific, but highly important, objective of the invention to provide an improved actuating mechanism for varying the camber of continuous skin airfoils through a relatively wide range of deflection angles characterized by its simplicity, compactness, rigidity, stability and reliability, and which permits of freedom of aircraft operation in virtually all conceivable dynamic pressure regions.

In one of its more detailed aspects, it is an object of the invention to provide an improved actuating mechanism for a continuous skin variable camber airfoil which permits deployment of leading and/or trailing edges to any desired position; yet, which provides positive skin support and remains rigid and stable at all operating positions, thereby insuring elimination of skin and/or flap flutter which tend to reduce aerodynamic performance characteristics.

Another objective of the invention is to provide an improved actuating mechanism for continuous skin variable camber airfoils which is characterized by short, simple load paths between the deflectable edge structure and the main airfoil support frame, and wherein the airfoil skin is not required to function as a load carrying element and is not subjected to appreciable chord-wise stress resulting from motion of the actuating linkage.

In one of its more important aspects, it is an object of the invention to provide an improved actuating mechanism for variable camber airfoils which is, because of its compact, rigid, stable actuating linkage, compatible with virtually any conventional airfoil design and can be readily adapted to the structural wing box of such airfoils without requiring either modification or displacement of the structural wing box and without impinging on the critical space generally reserved for the wing box.

A detailed objective of the invention is the provision of an improved actuating mechanism for continuous skin variable camber, airfoils which permits attainment of optimum deflection characteristics—i.e., leading edge negative (down) deflections up to on the order of 23°, trailing edge negative (down) deflections up to on the order of 32°, leading edge positive (up) deflections of up to on the order of 3°, and trailing edge positive (up) deflection of up to on the order of 6°—yet wherein relatively constant curvature of the smooth, continuous, uninterrupted skin is maintained throughout the area of deflection at each given desired operating position. Indeed, when used in connection with a variable camber leading edge, achievable deflection angles utilizing the linkage of the present invention are sufficiently great that separate lift flaps—e.g., Krueger flaps—are no longer required, thereby eliminating the need for separate high lift systems from wings requiring good low speed aerodynamic characteristics.

Yet another objective of the invention is to provide an improved actuating mechanism for continuous skin variable camber airfoils which greatly improves the versatility of the aircraft and which finds equally advantageous use with low speed flaps (high lift devices) or high speed ailerons (used for roll control) since the system has positive (up) deflection capability.

A further objective of the invention is the provision of a continuous skin variable camber airfoil actuating mechanism which, because of its simple, positive force-transmitting linkage arrangement, permits of rapid response times for desired changes in airfoil configurations, thus permitting enhanced maneuverability as required with high performance aircraft.

A somewhat more detailed objective of the invention is the provision of a simple, compact and reliable actuating mechanism for continuous skin variable camber airfoils which permits of ease of mechanization from conventional materials, and wherein the linkage arrangements employed are substantially identical irrespective of whether incorporated in the airfoil leading edge, the trailing edge, or both edges, thereby simplifying airfoil design, installation and maintenance.

DESCRIPTION OF THE DRAWINGS

These and other objects and advantages of the present invention will become more readily apparent upon reading the following detailed description and upon reference to the attached drawings, in which.

While the invention is susceptible of various modifications and alternative forms, specific embodiments thereof have been shown by way of example in the drawings and will herein be described in detail. It should be understood however, that it is not intended to limit the invention to the particular forms disclosed, but, on the contrary, the intention is to cover all modifications, equivalents and alternatives falling within the spirit and scope of the invention as expressed in the appended claims.

DETAILED DESCRIPTION

Figure 1:
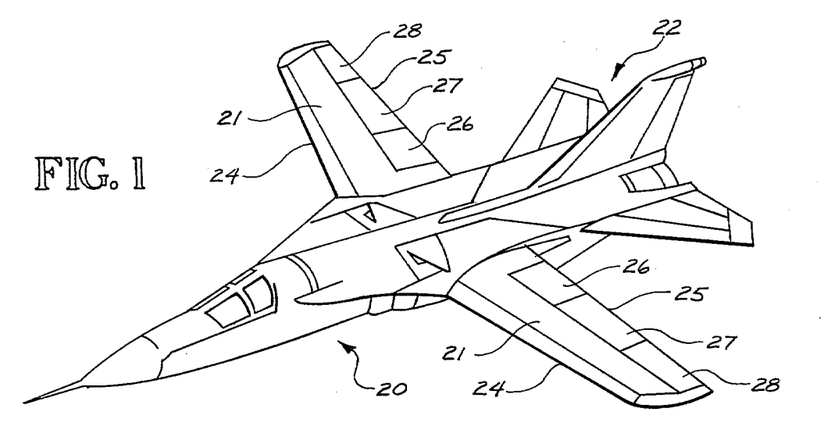
FIG. 1 is a perspective view of a typical high performance aircraft with which the present invention finds particularly advantageous, but by no means exclusive, use.

Referring first to FIG. 1, there has been diagrammatically illustrated a conventional high performance aircraft, generally indicated at 20, having (i) a main wing or airfoil 21 comprising a variable camber airfoil embodying features of the present invention and (ii), a conventional rudder and stabilizer assembly, generally indicated at 22. As here shown, the exemplary variable camber airfoil 21 includes a single-segment variable camber leading edge 24 and a three-segment variable camber trailing edge 25 having three deployable flaps 26, 27 and 28. However, as the ensuing description proceeds, those skilled in the art will appreciate that the present invention is not limited to the number of deployable segments employed on either or both of the leading and trailing edges 24, 25; but, rather, finds equally advantageous use with either single-segment or multiple-segment edges on either or both of the leading and trailing edges 24, 25 of the airfoil 21. Moreover, although the invention has, for purposes of understanding, here been illustrated as incorporated in a high performance aircraft capable of speeds ranging up to and into supersonic ranges, it is equally applicable to other types of aircraft including, for example, commercial and/or private aircraft capable of operating at any desired speeds within the subsonic, transonic and/or supersonic ranges.

Figure 2:
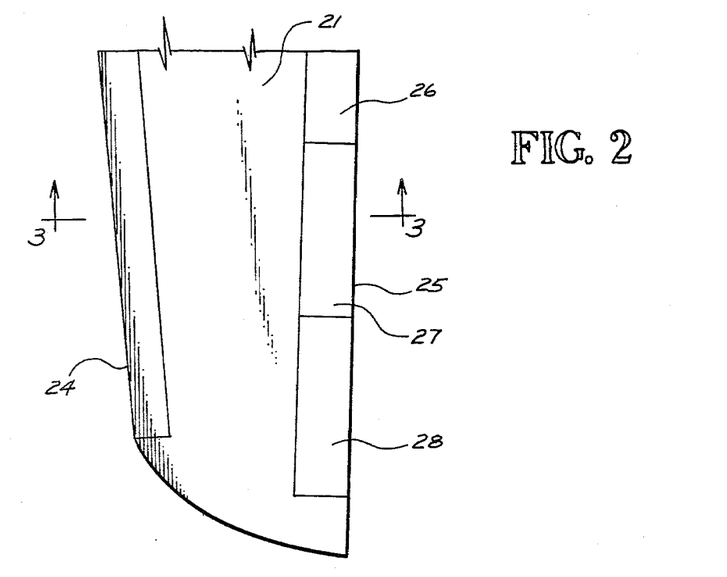
FIG. 2 is a fragmentary plan view of a portion of the main airfoil of the aircraft depicted in FIG. 1.

In the design of variable camber airfoils for such aircraft and, as best illustrated by reference to FIGS. 2 and 3 conjointly, it is desirable that provision be made for varying the camber of the airfoil in response to pilot commands and/or changes in flight conditions. In general, this can be accomplished by providing a variable camber leading edge capable of being deployed both downwardly (negative deflection) and upwardly (positive deflection), as indicated by the broken line positions in FIG. 3 for the leading edge 24. This may also be accomplished by providing a variable camber trailing edge, either in lieu of or in addition to the variable camber leading edge; such variable camber trailing edge also being deployable both downwardly (negative deflection) and upwardly (positive deflection), as indicated by the broken line positions depicted in FIG. 3. However, in order to achieve the desired deflection angles, the variable camber portion(s) of the airfoil 21—whether either or both of the leading and/or trailing edges—have, as heretofore indicated, generally required separate flaps, discontinuous upper skin surfaces, complex actuating linkage assemblies, and/or actuating linkage assemblies which project out of the airfoil's aerodynamic contour and/or which impinge on and, consequently, result in reduction in the size of, modification of, and/or elimination of, the structural wing box commonly employed within the airfoil.

Figure 3:
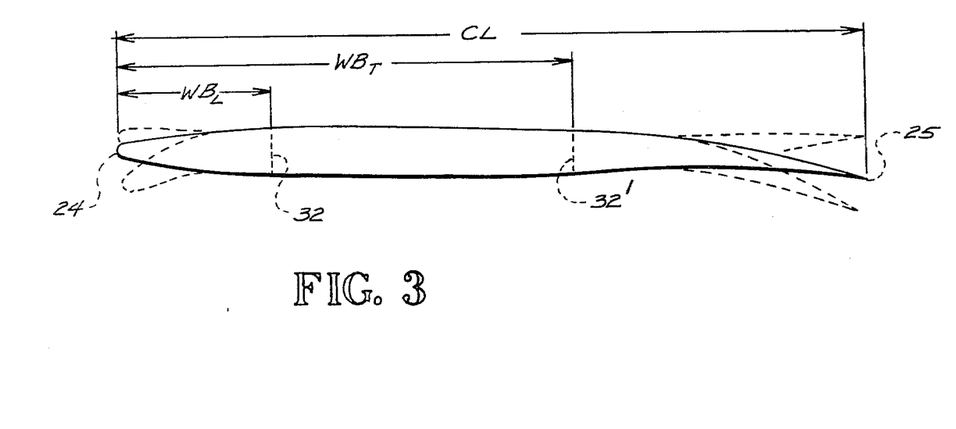
FIG. 3 is a highly diagrammatic sectional view taken substantially along the line 3—3 in FIG. 2, here depicting the optimal locations for the leading and trailing spars or structural frame members in a conventional rigid structural wing box and depicting also, in general terms, the relative percentages of chordal areas generally reserved (i) for the central rigid structural wing box, (ii) the trailing edge deflectable control flaps, ailerons and actuating linkages, and (iii) leading edge deflectable flaps and actuating mechanisms.

For example, referring to FIG. 3, there has been diagrammatically illustrated a typical multi-purpose variable camber airfoil 21 having a chord length CL and a centrally located structural wing box WB defined by leading and trailing main frame structural spars, diagrammatically illustrated at 32 and 32', respectively; such wing box WB extending along the full span-wise dimension of the airfoil 21. As a general rule, the wing box WB desirably occupies at least the central 40% of the airfoil's chordal dimension CL. Similarly, the trailing edge flaps, ailerons, and actuating mechanisms therefore, commonly require the trailing 40% of the airfoil chordal dimension CL—viz., the 40% of the airfoil disposed rearwardly of the rearmost wing box spar 32'. As a consequence, the deployable leading edge of the variable camber airfoil 21, together with its actuating mechanism, is generally limited to use of only the leading 20%, or less, of the airfoil's chordal dimension CL—viz., to that portion of the airfoil forward of the forwardmost wing box spar 32. Because of these severe space limitations, prior to the advent of the present invention, airfoil designers were generally forced to make unwanted compromises in design parameters in order to meet specific operational needs. The present invention obviates the need to make such compromises and permits both positive (up) and negative (down) deflection of either or both of the leading and trailing edges 24, 25 of the airfoil 21 through deflection angles equal to and/or greater than heretofore obtainable; yet, permits achievement of these results without impingement upon the space desirably reserved to accommodate the structural wing box WB.

Thus, in accordance with one of the important aspects of the present invention and, as best illustrated by reference to FIG. 4, there has been provided an improved actuating mechanism, generally indicated at 29, for permitting both controlled positive and controlled negative deployment of a span-wise structural edge member 30—which, for purposes of example, here takes the form of the span-wise structural edge member 30 for the leading edge 24 of the airfoil 21—to any selected angular position within a relatively wide range of desired rotational angles; and, which is characterized by (i) its stability and rigidity in all operating positions, (ii) its ability to provide load bearing support at all operative positions without requiring the upper airfoil skin to function as a load bearing element, and (iii) its compactness, thereby permitting the actuating mechanism 29 to be contained entirely within the aerodynamic contour of the airfoil 21, yet without requiring elimination, modification and/or displacement of the conventional airfoil structural wing box WB and without impinging upon the space desirably reserved for such wing box. To accomplish this, the present invention contemplates the use of two 4-bar linkage assemblies—one 4-bar linkage assembly to control horizontal and vertical displacement of the structural edge member 30 as it is deployed, and a second 4-bar linkage assembly to control (i) the angular rotation of the structural edge member 30 during deployment and (ii), the moment applied to the flexible continuous upper skin 31 in the variable camber portion of the airfoil.

Figure 4:
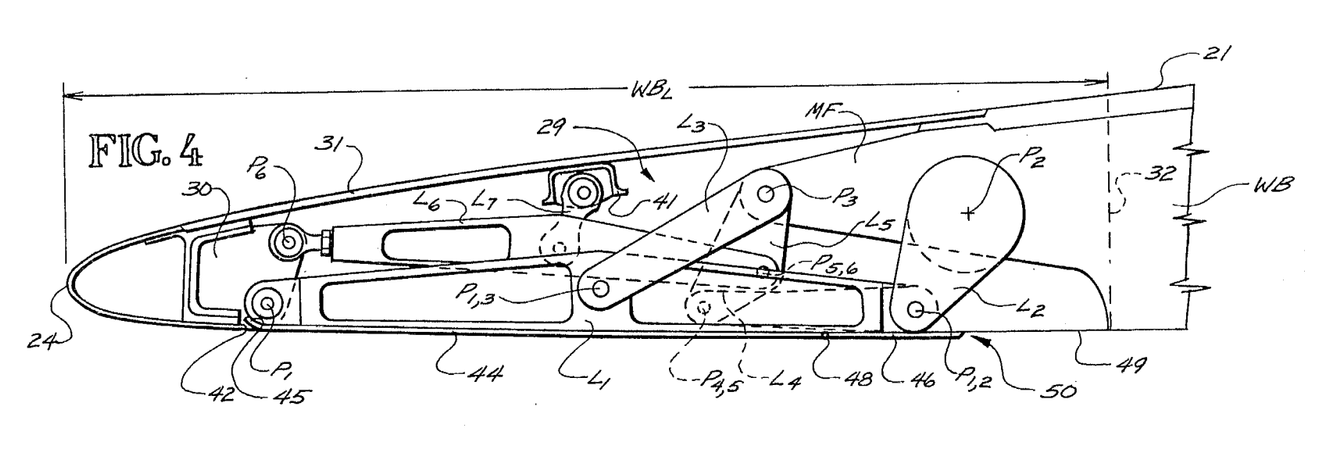
FIG. 4 is a sectional view of a forward variable camber section of a flexible continuous skin airfoil employing an actuating mechanism in accordance with the present invention, with the sectional view here taken transverse to the span-wise axis of the airfoil, and showing the airfoil in its cruise or uncambered position.
Figure 5:
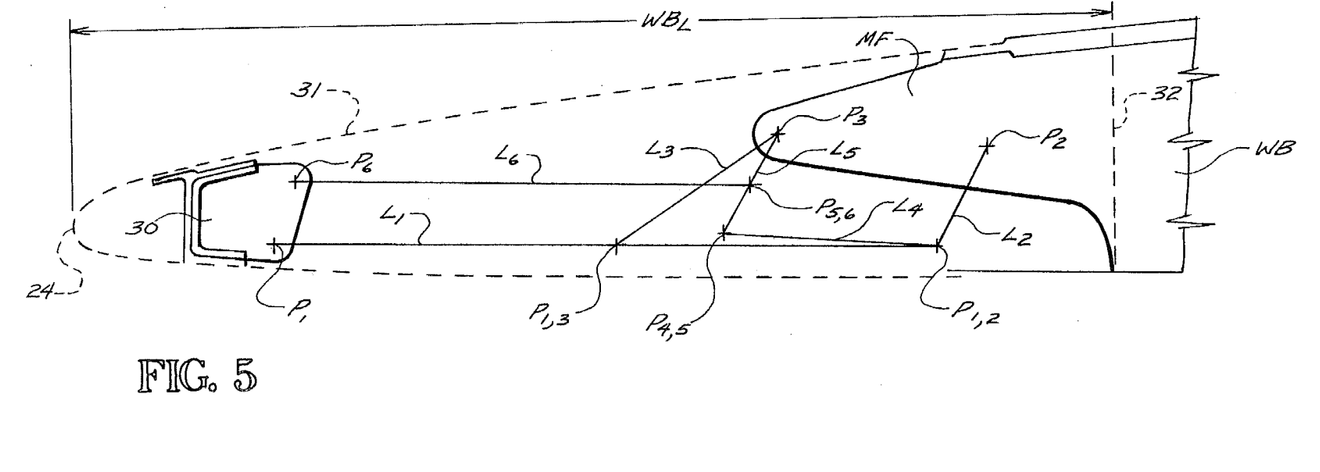
FIG. 5 is a highly simplified, diagrammatic line drawing here particularly illustrating in composite form the two 4-bar linkage mechanisms utilized with the present invention for deflecting the leading edge of an airfoil.

To permit controlled vertical and horizontal displacement of the structural edge member 30 and, as will best be understood by reference to FIGS. 4 and 5 conjointly (FIG. 5 comprises a simplified line diagram of the actuating control links employed), the first 4-bar linkage assembly includes a first generally horizontal control link $L_1$ pivotally connected at its forward end to the lower inboard edge of structural edge member 30 at point $P_1$, a pair of generally upright control links $L_2$ and $L_3$ pivotally connected at points $P_2$ and $P_3$, respectively, to the structural main frame MF (which here projects forwardly from the leading edge, diagrammatically indicated at 32, of the structural wing box WB) and, the forward projecting portion of the main frame MF. In carrying out the invention, the lower end of link $L_2$ is pivotally connected to the inboard end of link $L_1$ at point $P_{1,2}$; while the lower end of link $L_3$ is pivotally connected to link $L_1$ at point $P_{1,3}$ intermediate the ends of link $L_1$—i.e., intermediate points $P_1$ and $P_{1,2}$. The second 4-bar linkage assembly for controlling angular rotation of the structural edge member 30 during deployment comprises control link $L_1$ and control links $L_4$, $L_5$ and $L_6$. As here shown, control link $L_4$ comprises a relatively short, generally horizontal link pivotally connected at one end to control link $L_1$ at point $P_{1,2}$, with its opposite end extending towards, and terminating short of, the point $P_{1,3}$ of pivotal connection between links $L_1$ and $L_3$. Control link $L_5$ comprises a short, generally upright, link pivotally connected at its upper end to the main frame MF at point $P_3$ and pivotally connected at its lower end to the forward end of link $L_4$, as indicated at $P_{4,5}$. Control link $L_6$ is pivotally connected at point $P_6$ to the upper inboard edge of structural edge member 30, and extends rearwardly therefrom, having its opposite end pivotally connected to control link $L_5$ at point $P_{5,6}$ intermediate points $P_3$ and $P_{4,5}$.

Figure 6:
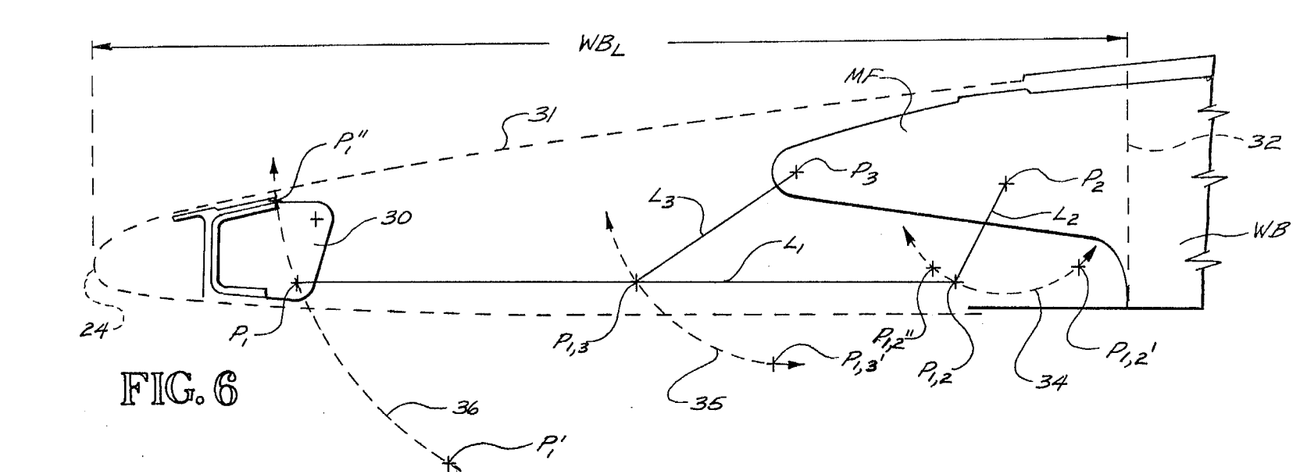
FIG. 6 is a view similar to FIG. 5, but here illustrating only the 4-bar linkage mechanism utilized to control horizontal and vertical displacement of the airfoil structural edge member.

To facilitate and understanding of the operation of the control actuating linkage assemblies, reference is first made to FIG. 6 wherein the airfoil 21 is diagrammatically illustrated for purposes of clarity with only the 4-bar linkage assembly for controlling vertical and horizontal displacement of the structural edge member 30—viz., links $L_1$, $L_2$ and $L_3$ and main frame MF. Thus, as here shown, it will be observed that as link $L_2$ is pivoted about point $P_2$ by any suitable means (not shown)—such, for example, as a rotary actuator having an output shaft passing through point $P_2$ and connected to link $L_2$ which would then function as a torque arm; or, a linear actuator coupled to links $L_1$, $L_2$ at point $P_{1,2}$—pivotal connection $P_{1,2}$ moves along a circular path 34. Similarly, point $P_{1,3}$ also moves along a circular path 35 about pivot point $P_3$. As a consequence of the foregoing motions, and the differing lengths of links $L_2$ and $L_3$, point $P_1$ (comprising the pivotal connection between control link $L_1$ and structural edge member 30) moves along a non-circular curvilinear path 36. Thus, with links $L_1$–$L_3$ and structural edge member 30 in the positions shown—viz., the cruise camber position—and, assuming that link $L_2$ is pivoted in a counterclockwise direction as viewed in the drawing, point $P_{1,2}$ moves to the right to the position $P_{1,2}'$; point $P_{1,3}$ moves to position $P_{1,3}'$; and, the structural edge member 30 is displaced downwardly and rearwardly so as to shift point $P_1$ to the position indicated at $P_1'$.

Figure 7:
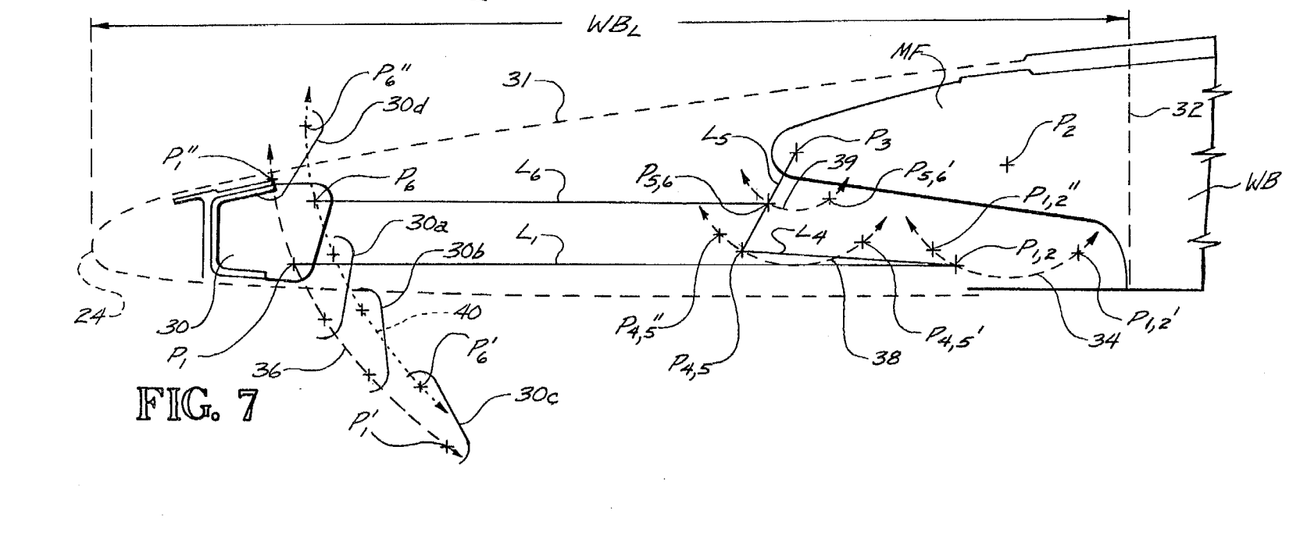
FIG. 7 is a view similar to FIG. 6, but here illustrating the 4-bar linkage arrangement utilized for controlling angular rotation of the leading edge and for controlling the moment applied to the end of the upper flexible skin.

Turning now to FIG. 7, the motions associated with the 4-bar linkage assembly for controlling angular rotation of structural edge member 30 have been diagrammatically illustrated; and, while links $L_2$ and $L_3$ are not reproduced for purposes of clarity, the paths of movement 34, 36 for points $P_{1,2}$ and $P_1$, respectively, have been shown. Thus, it will be appreciated that as link $L_1$ and its inboard pivot point $P_{1,2}$ move along circular path 34, the pivotal connection $P_{4,5}$ between links $L_4$ and $L_5$ moves along a circular path 38, while the pivotal connection $P_{5,6}$ between links $L_5$ and $L_6$ moves along a circular path 39. Since the outboard end of control link $L_6$ is pivotally connected at point $P_6$ to structural edge member 30 and, since point $P_6$ is fixed relative to point $P_1$, movement of link $L_1$ and its pivot point $P_{1,2}$ to position $P_{1,2}'$ as previously described is accompanied by corresponding circular movement of points $P_{4,5}$ and $P_{5,6}$ to positions $P_{4,5}'$ and $P_{5,6}'$, respectively. As a result, pivot point $P_6$ between structural edge member 30 and link $L_6$ moves along the curvilinear path 40 to point $P_6'$. Similarly, clockwise movement of point $P_{1,2}$ along path 34 causes corresponding clockwise rotation of links $L_3$ (FIG. 6) and $L_5$ about pivot $P_3$, thereby causing points $P_1$ and $P_6$ to move upwardly and to the left to positions $P_1''$ and $P_6''$, respectively. As a result of the foregoing movement, structural edge member 30 moves from the solid line position shown in FIG. 7 downwardly and to the right during negative deflection as indicated at the positions shown fragmentarily at 30a, 30b and 30c. During positive (up) deflection, structural edge member 30 moves upwardly and to the left from the solid line cruise camber position to the position shown fragmentarily at 30d.

With the foregoing description of the motions of the actuating mechanism 29 in mind and, upon reference to FIG. 4, it will be noted that the upper flexible skin 31 of the airfoil 21 is supported at the midpoint of its chordal dimension by means of a support link $L_7$ pivotally connected at its lower end to the central portion of link $L_6$ and its upper end to a bracket 41 rigidly secured to the inner surface of flexible skin 31. The arrangement is such that during deflection of the variable camber leading edge portion of the airfoil, the chord-wise mid-point of the flexible upper skin is maintained in a stable position of controlled constant curvature throughout its chord-wise length by support link $L_7$ which is interconnected directly to the actuating linkage assembly 29, with the latter and, especially, links $L_1$ and $L_3$ providing load bearing support for the structural edge member 30—i.e., the skin 31 provides no load bearing support. Of course, although the curvature of the flexible skin portion is maintained constant over is chord-wise length for any given deflection angle, the degree of curvature varies dependent upon the actual deflection angle. Not only does support link $L_7$ insure that proper constant curvature is maintained for given angular deflections but, in addition, the support link imparts sufficient structural stability to the flexible skin 31 as to effectively preclude skin flutter in all operative positions of the airfoil. Thus, the upper skin surface of the airfoil 21 is characterized, at all operative positions of the variable camber surface, by a smooth, uninterrupted, continuous surface completely devoid of both surface discontinuities—i.e., relatively sliding flaps, etc.—and curvature discontinuities—i.e., highly localized deflection areas.

In carrying out the present invention, the continuous flexible upper skin 31 is wrapped around and secured to the structural edge member 30, terminating at a point 42 just below and slightly forward of the point $P_1$ of pivotal connection between control link $L_1$ and structural edge member 30. The lowermost airfoil skin surface in the variable camber region of the airfoil 21 preferably comprises a generally rigid panel 44 secured to the lower surfaces of the control links $L_1$ for movement therewith; such rigid panel 44 having an upwardly curved forward portion 45 dimensioned to provide a smooth, relatively slidable, interface with the edge 42 of the flexible skin 31 at all angular positions of the variable camber edge. Rigid panel 44 is provided with a rigid flap 46, hingedly connected thereto in a span-wise direction as indicated at 48, and extending rearwardly beneath the skin surface 49 under the centrally disposed structural wing box portion of the airfoil 21 with the skin flap 46 and skin 49 defining a closely interfitting, slidable, lap joint, generally indicated at 50. To insure proper positioning of flap 46 relative to skin surface 49, the hinged connection 48 is preferably a conventional spring loaded hinge arrangement tending to bias flap 46 into sliding contact with the undersurface of skin portion 49 at all operative positions of the variable camber airfoil 21.

Figure 8:
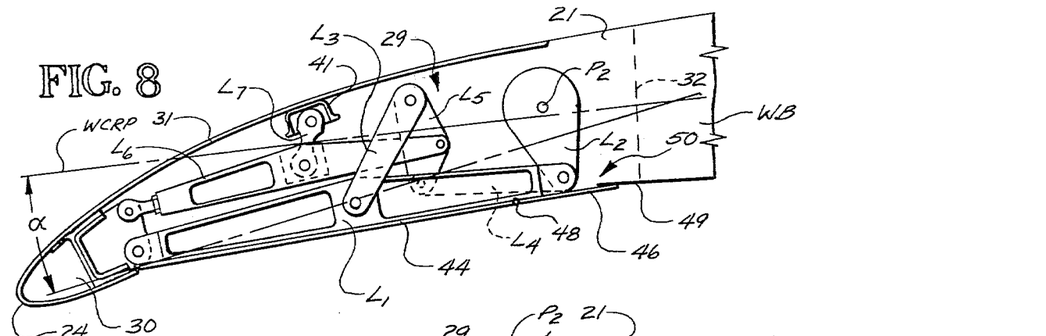
FIG. 8 is a sectional view similar to FIG. 4, but here depicting the leading edge of the airfoil at an intermediate negative (down) deflected position.
Figure 9:
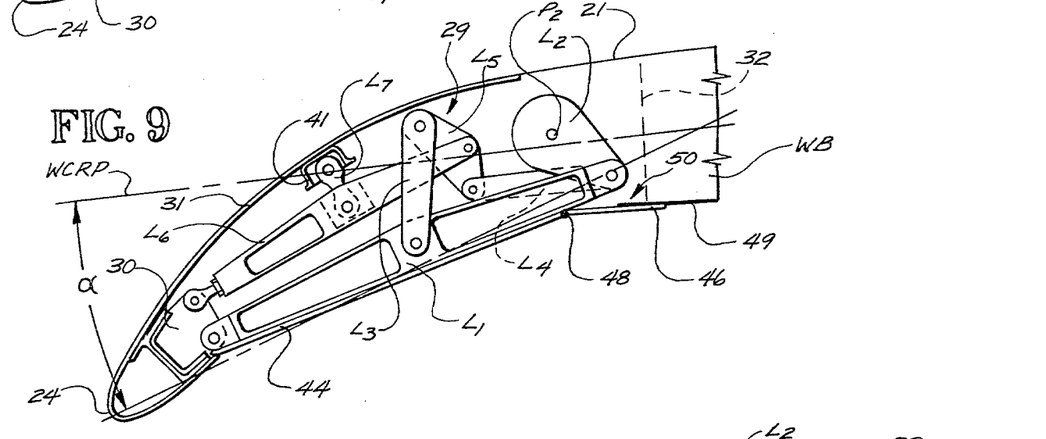
FIG. 9 is a vertical sectional view similar to FIGS. 4 and 8, but here depicting the leading edge of the airfoil in its fully deflected position defining an included angle with the wing chord reference plane of on the order of 23°.
Figure 10:
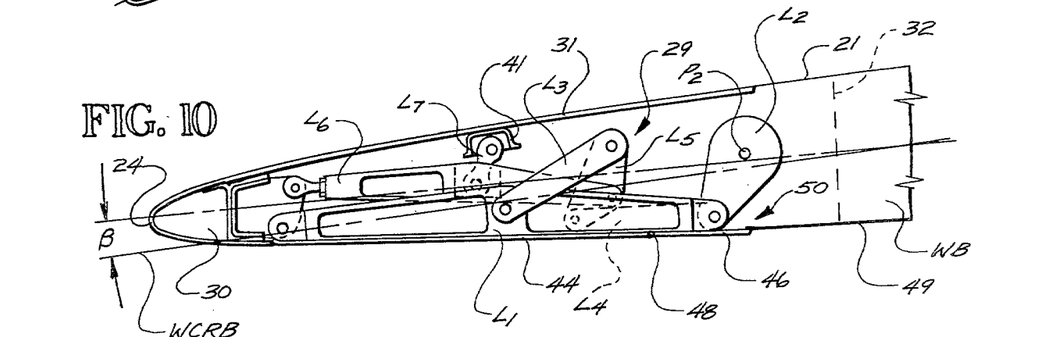
FIG. 10 is a sectional view similar to FIG. 4, but here illustrating the leading edge upon positive (up) deflection and defining an included angle with the wing chord reference plane on the order of 3°.

Referring now to FIGS. 4, 8 and 9 conjointly, it will be observed that during negative (down) deflection, link $L_2$ (which may, as previously indicated, comprise a torque arm driven by a suitable rotary actuator, not shown) moves in a counterclockwise direction as viewed in the drawing from the cruise camber position shown in FIG. 4, to the consecutive deflected positions depicted in FIGS. 8 and 9 wherein the variable camber airfoil 21 is shown in a partially deflected position (FIG. 8) and a fully deflected position (FIG. 9). As the angle of negative deflection $\alpha$ from the wing chord reference plane WCRP is progressively increased, the hinged sliding flange 46 carried by the links $L_1$ is flexed out of the plane of rigid skin panel 44 against the bias force exerted by the spring loaded hinged connection 48 and slides rearwardly beneath, and in face-to-face contact with, the skin 49 secured to the bottom surface of the structural wing box WB. During such deployment of the variable camber airfoil surface, the continuous upper flexible skin 31 is maintained in a stable structural condition of substantially constant curvature over its chord-wise length by support link $L_7$ which is pivotally secured (i) to the bracket 41 on the inner surface of flexible skin 31 at its chord-wise mid-point, and (ii) to control link $L_6$. Similarly, upon rotation of link $L_2$ in a clockwise direction from the cruise camber position shown in FIG. 4, the continuous skin variable camber airfoil 21 is deflected upwardly from the wing chord reference plane WCRP so as to define a positive (up) deflection angle $\beta$ as clearly illustrated in FIG. 10.

It has been found that in carrying out the present invention, leading edge negative (down) deflection angles $\alpha$ of up to on the order of 23° and leading edge positive (up) deflection angles $\beta$ of up to on the order of 3° from the wing chord reference plane WCRP can be readily achieved without modification, elimination and/or displacement of the structural wing box WB; this despite the fact that the leading structural edge 30 and the entire actuating mechanism 29 used to deploy the leading edge 24 can be dimensioned to occupy from only 12% to 20% of the chord length CL (FIG. 3) of the airfoil. The compact nature of the actuating mechanism permits attainment of such significant deflection angles $\alpha$ and $\beta$ without impingement upon the critical space reserved for the structural wing box WB even at angles of maximum negative (down) deflection on the order of 23°; and, indeed, since such deflection angles can often be achieved using substantially less than 20% of the chord-wise length CL of the airfoil, the invention actually permits of increase in the size of the wing box WB and, therefore, increased fuel storage capacity permitting significant increases in payload ranges. Moreover, the structural stability and rigidity of the actuating mechanism 29 is imparted via support link $L_7$ to the upper flexible skin 31, thereby precluding skin "flutter" and maintaining optimum aerodynamic skin curvatures and airfoil contours.

While the support link $L_7$ has been found to be highly advantageous in many, if not most, aerodynamic applications, it should be understood that it need not necessarily be employed in all applications. For example, in some instances where negative deflection angles of 23° are not necessarily required, it is still possible to utilize the actuating mechanism 29 of the invention without a support link such as the link $L_7$; provided that the chord-wise length of the flexible panel 31 is reduced and/or the thickness of the panel 31 is increased, thereby permitting attainment of the desired constant curvature and avoiding skin flutter.

Figure 11:
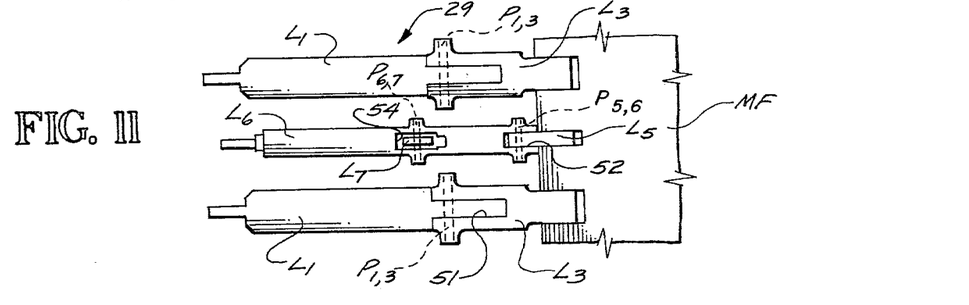
FIG. 11 is a fragmentary vertical plan view of the actuating linkage of the present invention, here depicting the links interconnected to the main structural frame members of the wing box, but with the airfoil skin removed for purposes of clarity; and, FIGS. 12 and 13 are sectional views similar to FIGS. 4 and 9, respectively, but here illustrating the actuating mechanism of the present invention as incorporated in a variable camber continuous skin stailing edge with the trailing edge being illustrated in the cruise position (FIG. 12) and in the position of maximum negative (down) deflection defining an included angle on the order of 32° with the wing chord reference plane (FIG. 13).

In keeping with the present invention and, for the purpose of further enhancing the stability and rigidity of the actuating mechanism 29, the two main load carrying members of the actuating mechanism—viz., control links $L_1$ and $L_3$—are dualized with all pivot pin connections in double shear. Thus, as best illustrated in FIG. 11, it will be observed that each 4-bar linkage assembly employed to control horizontal and vertical displacement of the structural edge member 30 comprises a pair of parallel control links $L_1$ and a corresponding pair of parallel control links $L_3$ respectively coupled thereto by pivot pins $P_{1,3}$ passing through yokes 51 formed in the lower ends of the links $L_3$. Similarly, although each actuating mechanism 29 employs only a single 4-bar linkage assembly for controlling the rotational angle of the structural edge member 30 and comprising the two parallel control links $L_1$ and one each of links $L_4$, $L_5$ and $L_6$ (C.f., FIGS. 4 and 11), the link $L_6$ is provided with a yoke 52 at its inboard end permitting pivotal connection with link $L_5$ by a pivot pin $L_{5,6}$ in double shear. Link $L_6$ is further provided with a centrally located vertical slot 54 positioned to receive the lower end of support link $L_7$, thereby permitting pivot pin $P_{6,7}$ to be maintained in double shear. As a consequence of this construction, actuating mechanisms 29 embodying the features of the present invention are highly rigid and stable; yet, simple, compact and sufficiently controllable to permit both positive and negative deflection of the structural edge member 30 through wide ranges of operative deflection angles.

Thus far, the present invention has been described in conjunction with an actuating mechanism 29 characterized by its ability to vary the camber of the leading edge 24 of a continuous skin airfoil 21. However, those skilled in the art will appreciate that the invention is not limited to usage in conjunction with leading edge actuating mechanisms but, in addition, it finds equally advantageous use in conjunction with variable camber trailing edges. Thus, referring to FIGS. 12 and 13, there has been illustrated an actuating mechanism, generally indicated at 29', which is, for all essential purposes, identical to the actuating mechanism 29 previously described in conjunction with FIGS. 4 through 11. Because of the substantial identity of components (except for relative dimensions) those elements depicted in FIGS. 12 and 13 which are substantially unchanged from those previously described (except for dimension) are identified by identical reference designations; while those which are similar in construction and identical in function are described by identical primed reference designations.

With the foregoing in mind, it will observed upon inspection of FIGS. 12 and 13 that the variable camber trailing edge portion of the airfoil 21 employs a trailing edge structural member 30' which is carried by and supported from a rearwardly projecting main frame MF integral with the rearmost edge 32' of the structural wing box by means of a pair of 4-bar linkage assemblies which are identical to those hereinabove described but, which are reflected in FIGS. 12 and 13 as mirror image representations of the actuating mechanism 29 shown in FIGS. 4–11. As here shown, the continuous flexible upper skin 31 is secured to the trailing structural edge member 30' and forms a variable camber trailing edge flexible panel which defines a continuous, uninterrupted smooth upper surface continuation of a rigid trailing edge assembly 55 defining the trailing edge 25 of the airfoil 21. In this instance, the lower rigid skin panel 44' carried by the control links $L_1$ is provided with an upwardly curved forward edge 44a and an upwardly curved rearward edge 44b which respectively form close, relatively sliding, interfaces with the lower airfoil skin 49 carried by the structural wing box WB and the rigid trailing edge assembly 55.

Figures 12, 13:
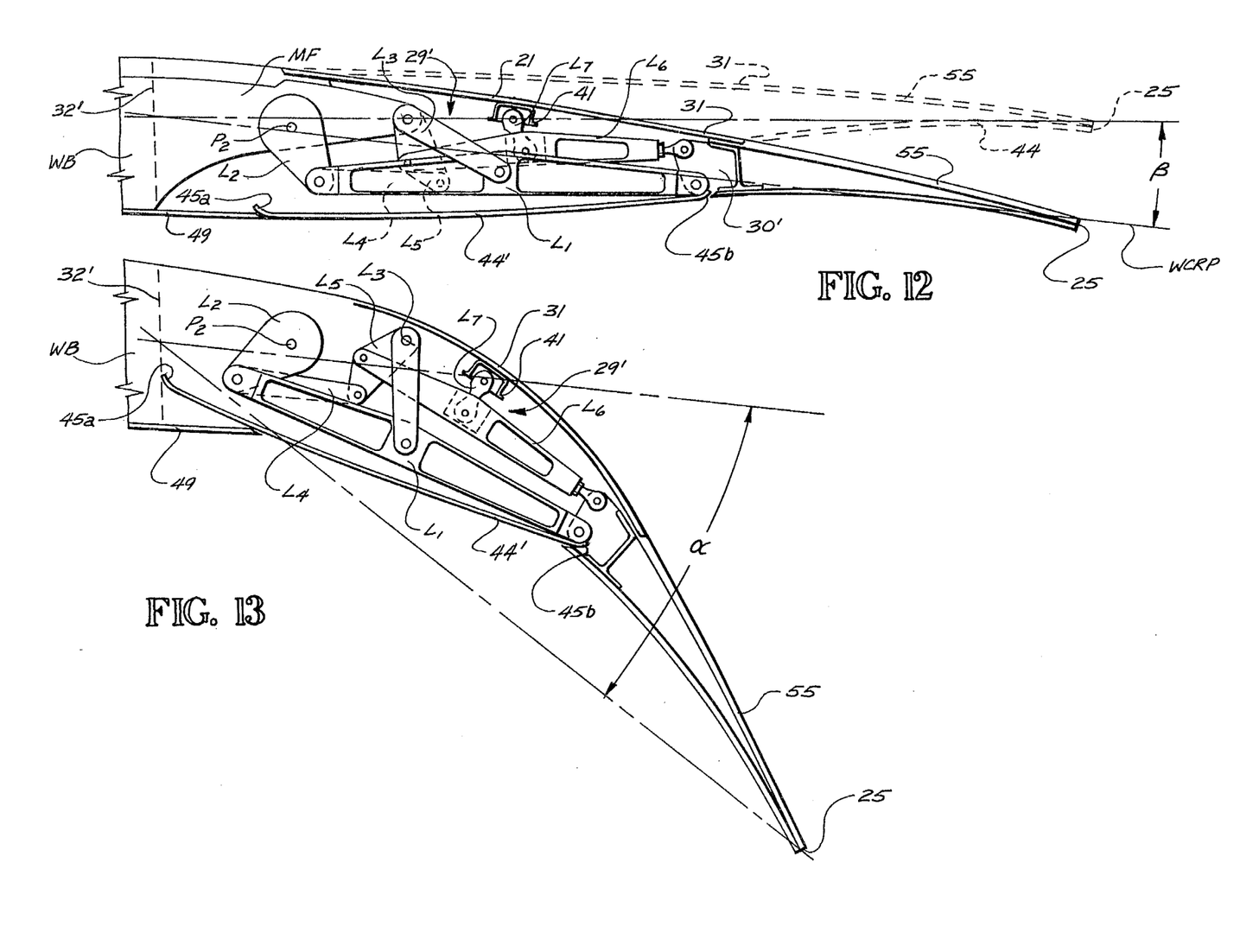

Thus, the arrangement is such that when the actuating mechanism 29' is actuated—for example, by a conventional rotary or linear actuator (not shown) in the manner previously described—to deflect the trailing edge 25 downwardly from the solid line cruise camber position shown in FIG. 12, link $L_2$ is rotated in a clockwise direction about pivot $P_2$ from the position shown towards the position of maximum negative (down) deflection depicted in FIG. 13. Alternatively, when positive (up) deflection is desired, link $L_2$ is pivoted in a counterclockwise direction as viewed in FIG. 12 to cause the rigid trailing edge assembly 55 to swing upwardly towards the broken line position shown in FIG. 12. It has been found that in the practice of the present invention, negative trailing edge deflection angles $\alpha$ from the wing chord reference plane WCRP of up to on the order of 32° may be readily attained, while positive deflection angles $\beta$ of up to on the order of 6° can be attained. Yet, the constant curvature of the variable camber surface of flexible skin 31 throughout the chordwise dimension of the skin can be maintained at all deflection angles, while the skin 31 is supported by support link $L_7$ and, hence, skin flutter is essentially eliminated.

Thus, it will be appreciated that there has herein been described a simple, compact actuating mechanism for use with continuous skin variable camber airfoils which is characterized by its stability and rigidity and which can be readily used with either or both of variable camber leading and/or trailing edges without in any way impinging upon the space reserved for the structural wing box WB. Because of the structural stability and rigidity of the actuating mechanism which serves to provide all load bearing support, the continuous flexible upper skin is not required to function as a load bearing element. Maximum deflection angles may be readily attained and, the simple, positive, force-transmitting nature of the 4-bar linkage assembly defined by links $L_1$, $L_2$ and $L_3$ and main frame MF, insures that rapid response times can also be achieved permitting ease of in-flight reconfiguration of airfoil contours.

What is claimed is:

1. In a continuous skin variable camber airfoil of the type having (i) a rigid, centrally located, span-wise structural wing box including means defining both leading and trailing structural main frames, (ii) a leading structural edge member spaced forwardly from said wing box, (iii) a trailing structural edge member spaced rearwardly from said wing box, and (iv) a wing chord reference plane extending through the leading and trailing edges of said airfoil, an improved actuating mechanism for interconnecting at least one of said leading and trailing structural edge members to said main frame defining means so as to permit controlled deflection of said at least one structural edge member relative to said wing chord reference plane while providing structural load bearing support for said at least one structural edge member in all operating positions thereof, said actuating mechanism comprising, in combination:

(a) a first 4-bar linkage assembly for controlling horizontal and vertical displacement of said structural edge member and including (i) said main frame defining means, (ii) a first generally horizontal control link pivotally connected adjacent one end thereof to the lower inboard edge of said structural edge member at a point $P_1$ and projecting therefrom toward said structural wing box, (iii) a second generally upright control link pivotally connected adjacent its upper end to said main frame defining means at a point $P_2$ and pivotally connected adjacent its lower end to the other end of said first control link at a point $P_{1,2}$, and (iv) a third control link having a length greater than said second control link pivotally connected at one end to said first control link at a point $P_{1,3}$ intermediate points $P_1$ and $P_{1,2}$ and at its other end to said main frame defining means at a point $P_3$ spaced from and intermediate the points $P_1$ and $P_2$, said third control link projecting generally towards said structural edge member from point $P_3$ when in the cruise camber position;

(b) a second 4-bar linkage assembly for controlling angular rotation of said structural edge member and including (i) said first control link, (ii) a fourth generally horizontal control link pivotally connected at one end to said first control link at point $P_{1,2}$ and extending towards and terminating short of point $P_{1,3}$, (iii) a fifth generally upright control link pivotally connected at its lower end to the free end of said fourth link at a point $P_{4,5}$ and pivotally connected at its upper end to said main frame defining means at point $P_3$, and (iv) a sixth generally horizontal control link pivotally connected at one end to the upper inboard edge of said structural edge member at a point $P_6$ and pivotally connected at its opposite end to said fifth control link at a point $P_{5,6}$ intermediate points $P_3$ and $P_{4,5}$; and, (c) actuating means for causing the pivotal connection at point $P_{1,2}$ between said first, second and fourth control links to pivot about point $P_2$.

2. A variable camber airfoil actuating mechanism as set forth in claim 1 wherein said structural edge member comprises the structural edge member for the leading edge of said airfoil.

3. A variable camber airfoil actuating mechanism as set forth in claim 2 wherein said leading edge is deployable through negative (down) deflection angles of up to on the order of 23° from said wing chord reference plane.

4. A variable camber airfoil actuating mechanism as set forth in claims 2 or 3 wherein said leading edge is deployable through positive (up) deflection angles of up to on the order of 3° from said wing chord reference plane.

5. A variable camber airfoil actuating mechanism as set forth in claim 1 wherein said structural edge member comprises the structural edge member for the trailing edge of said airfoil.

6. A variable camber airfoil actuating mechanism as set forth in claim 5 wherein said trailing edge is deployable through negative (down) deflection angles of up to on the order of 32° from said wing chord reference plane.

7. A variable camber airfoil actuating mechanism as set forth in claims 5 or 6 wherein said trailing edge is deployable through positive (up) deflection angles of up to on the order of 6° from said wing chord reference plane.

8. A variable camber airfoil actuating mechanism as set forth in claim 1 wherein said first, second, third, fourth, fifth and sixth links are disposed entirely within the airfoil contour at all operative deflection angles.

9. A variable camber airfoil actuating mechanism as set forth in claims 1 or 8 wherein said structural edge member comprises the structural edge member for the leading edge of said airfoil and said actuating mechanism occupies not more than 20% of the chord-wise length of said airfoil at all operative positions thereof.

10. A variable camber airfoil actuating mechanism as set forth in claims 1 or 8 wherein said structural edge member comprises the structural edge member for the leading edge of said airfoil and said actuating mechanism occupies from on the order of 12% to 20% of the chord-wise length of said airfoil at all operative positions thereof.

11. In a continuous skin variable camber airfoil of the type having (i) a rigid, centrally located, span-wise structural wing box including means defining both leading and trailing structural main frames, (ii) a leading structural edge member spaced forwardly from said wing box, (iii) a trailing structural edge member spaced rearwardly from said wing box, and (iv) a wing chord reference plane extending through the leading and trailing edges of said airfoil, an improved actuating mechanism for interconnecting at least one of said leading and trailing structural edge members to said main frame defining means so as to permit controlled deflection of said at least one structural edge member relative to said wing chord reference plane while providing structural load bearing support for said at least one structural edge member in all operating positions thereof, said actuating mechanism comprising, in combination:

(a) a first 4-bar linkage assembly for controlling horizontal and vertical displacement of said structural edge member and including (i) said main frame defining means, (ii) a first generally horizontal control link pivotally connected adjacent one end thereof to the lower inboard edge of said structural edge member at a point $P_1$ and projecting therefrom toward said structural wing box, (iii) a second generally upright control link pivotally connected adjacent its upper end to said main frame defining means at a point $P_2$ and pivotally connected adjacent its lower end to the other end of said first control link at a point $P_{1,2}$, and (iv) a third control link having a length greater than said second control link pivotally connected at one end to said first control link at a point $P_{1,3}$ intermediate points $P_1$ and $P_{1,2}$ and at its other end to said main frame defining means at a point $P_3$ spaced from and intermediate the points $P_1$ and $P_2$, said third control link projecting generally towards said structural edge member from point $P_3$ when in the cruise camber position;

(b) a second 4-bar linkage assembly for controlling angular rotation of said structural edge member and including (i) said first control link, (ii) a fourth generally horizontal control link pivotally connected at one end to said first control link at point $P_{1,2}$ and extending towards and terminating short of point $P_{1,3}$, (iii) a fifth generally upright control link pivotally connected at its lower end to the free end of said fourth link at a point $P_{4,5}$ and pivotally connected at its upper end to said main frame defining means at point $P_3$, and (iv) a sixth generally horizontal control link pivotally connected at one end to the upper inboard edge of said structural edge member at a point $P_6$ and pivotally connected at its opposite end to said fifth control link at a point intermediate points $P_3$ and $P_{4,5}$;

(c) a flexible continuous upper variable camber skin secured to said structural wing box and to said at least one structural edge member and spanning the space therebetween;

(d) a support link pivotally secured to the inner surface of said flexible skin at the mid-point of the chordal extent thereof, said support link being pivotally connected adjacent its lower end to said sixth control link intermediate the points $P_6$ and $P_{5,6}$ for maintaining a constant curvature of said flexible skin throughout its chordal extent; and, (e) actuating means for causing the pivotal connection at point $P_{1,2}$ between said first, second and fourth control links to pivot about point $P_2$.

12. A variable camber airfoil actuating mechanism as set forth in claim 11 wherein said structural edge member comprises the structural edge member for the leading edge of said airfoil.

13. A variable camber airfoil actuating mechanism as set forth in claim 12 wherein said leading edge is deployable through negative (down) deflection angles of up to on the order of 23° from said wing chord reference plane.

14. A variable camber airfoil actuating mechanism as set forth in claims 12 or 13 wherein said leading edge is deployable through positive (up) deflection angles of up to on the order of 3° from said wing chord reference plane.

15. A variable camber airfoil actuating mechanism as set forth in claim 11 wherein said structural edge member comprises the structural edge member for the trailing edge of said airfoil.

16. A variable camber airfoil actuating mechanism as set forth in claim 15 wherein said trailing edge is deployable through negative (down) deflection angles of up to on the order of 32° from said wing chord reference plane.

17. A variable camber airfoil actuating mechanism as set forth in claims 15 or 16 wherein said trailing edge is deployable through positive (up) deflection angles of up to on the order of 6° from said wing chord reference plane.

18. A variable camber airfoil actuating mechanism as set forth in claim 11 wherein said first, second, third, fourth, fifth and sixth links are disposed entirely within the airfoil contour at all operative deflection angles.

19. A variable camber airfoil actuating mechanism as set forth in claims 11 or 18 wherein said structural edge member comprises the structural edge member for the leading edge of said airfoil and said actuating mechanism occupies not more than 20% of the chord-wise length of said airfoil at all operative positions thereof.

20. A variable camber airfoil actuating mechanism as set forth in claims 11 or 18 wherein said structural edge member comprises the structural edge member for the leading edge of said airfoil and said actuating mechanism occupies from on the order of 12% to 20% of the chord-wise length of said airfoil at all operative positions thereof.

21. In a continuous skin variable camber airfoil of the type having (i) a rigid, centrally located, span-wise structural wing box including means defining both leading and trailing structural main frames, (ii) a leading structural edge member spaced forwardly from said wing box, (iii) a trailing structural edge member spaced rearwardly from said wing box, and (iv) a wing chord reference plane extending through the leading and trailing edges of said airfoil, an improved actuating mechanism for interconnecting at least one of said leading and trailing structural edge members to said main frame defining means so as to permit controlled deflection of said at least one structural edge member relative to said wing chord reference plane while providing structural load bearing support for said at least one structural edge member in all operative positions thereof, said actuating mechanism comprising, in combination;

(a) a first 4-bar linkage assembly for controlling horizontal and vertical displacement of said structural edge member, said first 4-bar linkage assembly including a first generally horizontal control link pivotally connected to the lower inboard edge of said structural edge member at a point $P_1$ and projecting therefrom towards said structural wing box, a second control link having its lower end pivotally connected to the inboard end of said first control link at a point $P_{1,2}$, and a third control link having its lower end pivotally connected to said first control link at a point $P_{1,3}$ intermediate points $P_1$ and $P_{1,2}$, said third control link having a greater length than said second control link, said second and third control links having their upper ends pivotally connected to said main frame defining means at points $P_2$ and $P_3$, respectively, and spaced apart along the chordal dimension of said main frame defining means with the pivotal connection $P_3$ of said third control link to said main frame defining means being intermediate said structural edge member and the pivot point $P_2$ so that upon pivotal movement of said second control link in a direction to reduce the chordal distance between said structural edge member and said main frame defining means said third control link is pivoted to cause vertically downward and horizontal displacement of said structural edge member relative to said wing chord reference plane and, upon pivotal movement of said second control link in the opposite direction, pivotal movement of said third link causes said structural edge member to move vertically upward and horizontally relative to said wing chord reference plane;

(b) a second 4-bar linkage assembly for controlling the rotational angle of said structural edge member, said second 4-bar linkage assembly including said first control link, a fourth generally horizontal control link having its inboard end pivotally connected to the inboard end of said first control link at point $P_{1,2}$, a fifth control link pivotally connected to said main frame defining means at point $P_3$, said fifth control link having its lower end pivotally connected to said fourth control link at a point $P_{4,5}$ intermediate points $P_{1,2}$ and $P_{1,3}$, and a sixth control link pivotally connected adjacent one end to the upper inboard edge of said structural edge member at a point $P_6$ and at its opposite end to said fifth control link at a point $P_{5,6}$ intermediate points $P_3$ and $P_{4,5}$;

(c) said first, second, third, fourth, fifth and sixth control links all being disposed entirely within the contour of said airfoil at all operative positions of said variable camber airfoil; and, (d) actuating means for causing the pivotal connection at point $P_{1,2}$ between said first, second and fourth control links to pivot about point $P_2$.

22. A variable camber airfoil actuating mechanism as set forth in claim 21 wherein said continuous skin airfoil includes a flexible continuous upper skin secured to said structural wing box and to said at least one structural edge member and spanning the space therebetween, and a support link pivotally secured to the inner surface of said flexible skin at the mid-point of the chordal extent thereof, said support link being pivotally connected adjacent its lower end to said sixth control link intermediate the points $P_6$ and $P_{5,6}$ for maintaining a constant curvature of said flexible skin throughout its chordal extent.

23. In a continuous skin variable camber airfoil of the type having (i) a rigid, centrally located, span-wise structural wing box including means defining both leading and trailing structural main frames, (ii) a leading structural edge member spaced forwardly from said wing box, (iii) a trailing structural edge member spaced rearwardly from said wing box, and (iv) a wing chord reference plane extending through the leading and trailing edges of said airfoil, improved actuating means for interconnecting said leading and trailing structural edge members to said main frame defining means so as to permit controlled deflection of said structural edge members relative to said wing chord reference plane while providing structural load bearing support for said structural edge members in all operative positions thereof, said actuating means including an actuating mechanism interconnecting each of said structural edge members to said main frame defining means with each of said actuating mechanisms comprising, in combination:

(a) a first 4-bar linkage assembly for controlling horizontal and vertical displacement of the associated one of said structural edge members, said first 4-bar linkage assembly including a first generally horizontal control link pivotally connected to the lower inboard edge of the associated one of said structural edge members at a point $P_1$ and projecting therefrom towards said structural wing box, a second control link having its lower end pivotally connected to the inboard end of said first control link at a point $P_{1,2}$, and a third control link having its lower end pivotally connected to said first control link at a point $P_{1,3}$ intermediate points $P_1$ and $P_{1,2}$, said third control link having a greater length than said second control link, said second and third control links having their upper ends pivotally connected to said main frame defining means at points $P_2$ and $P_3$, respectively, and spaced apart along the chordal dimension of said main frame defining means with the pivotal connection $P_3$ of said third control link to said main frame defining means being intermediate the associated one of said structural edge members and the pivot point $P_2$ so that upon pivotal movement of said second control link in a direction to reduce the chordal distance between the associated one of said structural edge members and said main frame defining means said third control link is pivoted to cause vertically downward and horizontal displacement of the associated one of said structural edge members relative to said wing chord reference plane and, upon pivotal movement of said second control link in the opposite direction, pivotal movement of said third link causes the associated one of said structural edge members to move vertically upward and horizontally relative to said wing chord reference plane;

(b) a second 4-bar linkage assembly for controlling the rotational angle of the associated one of said structural edge members, said second 4-bar linkage assembly including said first control link, a fourth generally horizontal control link having its inboard end pivotally connected to the inboard end of said first control link at point $P_{1,2}$, a fifth control link pivotally connected to said main frame defining means at point $P_3$, said fifth control link having its lower end pivotally connected to said fourth control link at a point $P_{4,5}$ intermediate points $P_{1,2}$ and $P_{1,3}$, and a sixth control link pivotally connected adjacent one end to the upper inboard edge of the associated one of said structural edge members at a point $P_6$ and at its opposite end to said fifth control link at a point $P_{5,6}$ intermediate points $P_3$ and $P_{4,5}$;

() said first, second, third, fourth, fifth and sixth control links all being disposed entirely within the contour of said airfoil at all operative positions of said variable camber airfoil; and, (d) actuating means for causing the pivotal connection at point $P_{1,2}$ between said first, second and fourth control links to pivot about point $P_2$.

24. Variable camber airfoil actuating means as set forth in claim 23 wherein said continuous skin airfoil includes first and second flexible continuous upper skins secured to said structural wing box and to respective different ones of said leading and trailing structural edge members and spanning the spaces therebetween, and a support link pivotally secured to the inner surface of each of said flexible skins at the mid-points of the chordal extent thereof, said support links being pivotally connected adjacent their lower end to respective different ones of said sixth control links intermediate the points $P_6$ and $P_{5,6}$ for maintaining a constant curvature of each of said flexible skins throughout their chordal extent.

* * * * *